United States Patent [19]

Virgin

[11] 4,046,409

[45] Sept. 6, 1977

[54] JOINING ARRANGEMENT FOR VENTILATION DUCTS AND THE LIKE

[75] Inventor: Eskil Virgin, Kungalv, Sweden

[73] Assignee: Vavra Plat AB of Kungalv, Sweden

[21] Appl. No.: 705,017

[22] Filed: July 14, 1976

[30] Foreign Application Priority Data

Aug. 13, 1975 Sweden .............................. 7509047

[51] Int. Cl.² ............................................ F16L 25/00
[52] U.S. Cl. .................... 285/305; 285/335; 285/424; 285/DIG. 22
[58] Field of Search ............. 285/424, DIG. 22, 331, 285/305, 335

[56] References Cited

U.S. PATENT DOCUMENTS

| 565,499 | 8/1896 | Patterson | 285/424 X |
| 1,152,568 | 9/1915 | Stearns | 285/424 X |
| 1,155,761 | 10/1915 | Scherer | 285/424 X |
| 1,935,690 | 11/1933 | Zack | 285/424 X |
| 2,330,769 | 9/1943 | Wichner | 285/424 X |
| 3,246,918 | 4/1966 | Burghart | 285/424 X |
| 3,754,782 | 8/1973 | DeLord | 285/424 |

*Primary Examiner*—Thomas F. Callaghan
*Attorney, Agent, or Firm*—Holman & Stern

[57] ABSTRACT

An arrangement for joining of ventilation ducts and the like comprises a first and a second member intended for connection with a first duct end and a second duct end resp., the second member being provided with an upright stiffening leg and a horizontal leg terminated by a hook-shaped member, which can be snapped over a raised edge of the first member. The first member comprises a horizontal lip intended to be received by the second member.

2 Claims, 3 Drawing Figures

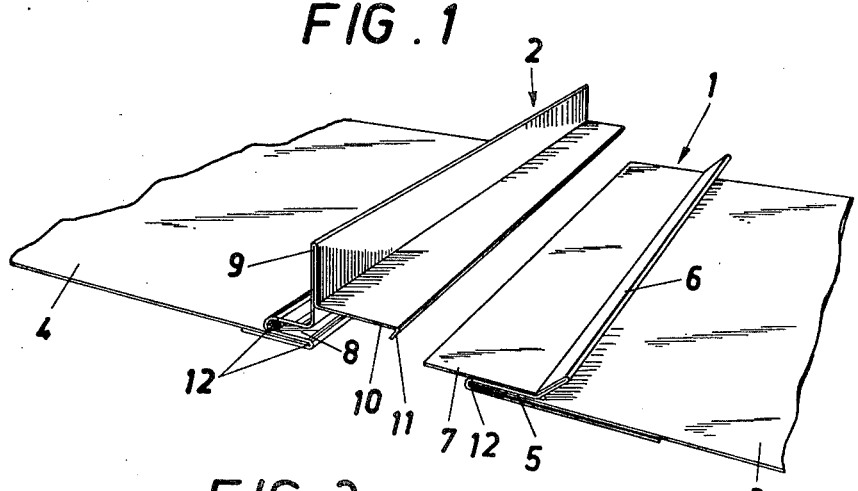
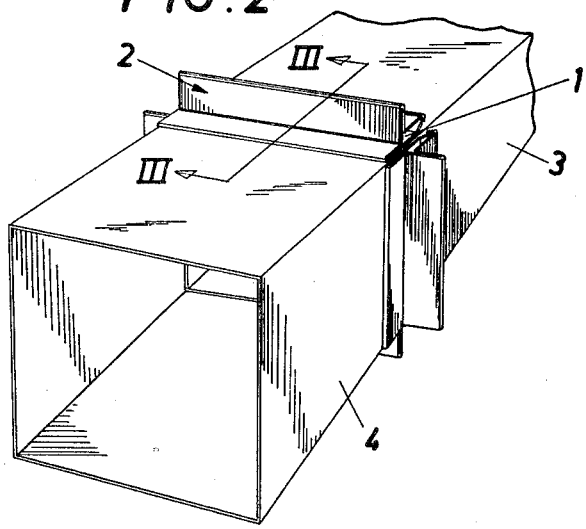
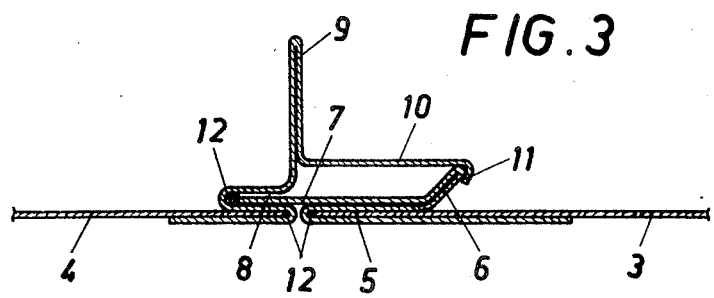

4,046,409

JOINING ARRANGEMENT FOR VENTILATION DUCTS AND THE LIKE

BACKGROUND OF THE INVENTION

The present invention relates to joining arrangement for ventilation ducts and the like, comprising a first and a second member intended for connection with a first and a second duct end resp, and by means of which joining arrangement two duct ends can be joined together by a snap lock.

It is desirable to, in a simple way, be able to join one duct member to another when the latter has been mounted e.g. under a roof. Since ventilation ducts often are made of thin plate without sufficient stiffness, a certain deformation of the duct walls often occurs, which makes the joining difficult. It is therefore desirable to provide the ducts with joining arrangements, which stiffen the ends of the ducts so that the joining easily can be accomplished. It is previously known a joining arrangement which comprises connecting strips attached to the duct ends and a guide rail, which can be pushed over the connecting strips. This arrangement is rather complicated and the joining of the duct members requires quite a lot of time. There are also previously known joining arrangements, by means of which two duct members can be joined together by a snap lock. This construction involves a simple and quick mounting of the ventilation duct. The previously known constructions of this kind have however required a considerable quantity of sealing material to be applied in the joints, for providing a ventilation duct with sufficient tightness.

SUMMARY OF THE INVENTION

The purposes of the present invention is to provide a joining arrangement for rectangular or square ventilation ducts, by means of which a tight connection between the duct members is otained by using a very small quantity of sealing material, and which stiffens the duct ends so much that the mounting can be accomplished in a simple way by a snap lock, with the duct members mounted e.g. under a roof. This is achieved by means of a joining arrangement characterized by the features stated in the claims. The characteristics and advantages of the invention are further described with reference to the accompanying drawing, which represents an embodiment.

BRIEF DESCRIPTION OF THE DRAWING

FIG. 1 shows in perspective two duct ends provided with joining members according to the invention, FIG. 2 shows in perspective a part of a ventilation duct provided with joining arrangements according to the invention, FIG. 3 is an enlarged section along the line III—III in FIG. 2.

DESCRIPTION OF A PREFERRED EMBODIMENT

The joining arrangement comprises two members 1 and 2, which are fixed to a duct end 3 and 4 resp. The joining member 1 comprises a part 5 having a cross section shaped as a recumbent U. This U-shaped part 5 receives and is fixed to the duct end 3. The upper leg of the U passes into a raised edge 6, which is bent 180° and passes into a lip 7, which is essentially in parallel with the legs of the U. The joining member 2 comprises a part 8 having a S-shaped cross section, which part on one hand receives and is fixed to the duct end 4, and on the other hand is intended for receiving the lip 7 of the joining member 1. The upper shank of the S is bent upwards essentially perpendicular and passes into a L-shaped part. The vertical leg of the L consists of a double folded stiffening leg 9, intended for providing the joint with a sufficient stiffness and stability. The horizontal part 10 of the L is terminated by a hook-shaped member 11.

When joining the members 1 and 2 together the lip 7 is introduced into the S-shaped part 8 and the hook-shaped member 11 is snapped over the edge 6.

In the bottom of the U-shaped part 5 and in the bottom of the two trenches formed by the S-shaped part 8 sealings 12 are applied. The sealings are appropriately applied as strings before folding and shaping of the joining members take place.

If a seal between the corners of the duct ends at the joint is desirable a plate member e.g. in the shape of a right angle isosceles triangle is introduced with one corner in each of the stiffening legs 9 perpendicular to each other, and with the right-angled corner of the plate member projecting between the stiffening legs 9 of the two joints. One edge of the plate member lies close to the corner of the duct and seals any opening which may occur between the duct ends.

The joining members 1 and 2 are attached to the duct ends 3 and 4 resp. in a suitable way, e.g. by point welding, riveting, gluing or by plate screws.

The invention is not limited to the embodiment shown in the drawing but can be varied within the scope of the claims.

What I claim is:

1. A joint for joining the confronting edge portions of panels of ventilation ducts or the like, said joint comprising:
    a first member including a pair of overlying legs defining a flat, U-shaped cross section telescopically receiving therein one panel edge to be joined, one leg of said pair of legs comprising a portion extending angularly from said one leg and forming a reverse-fold defining a raised edge, said reverse-fold continuing in a panel portion overlying said one leg forming the raised edge and comprising a free-edged panel extending beyond said one leg; and
    a second member including a substantially flat, S-shaped cross section including a socket portion receiving another panel edge to be joined, said free-edged panel of the first member extending into a second socket portion of said S-shaped cross section, said second socket portion of the S-shaped cross section continuing in a reverse-folded stiffening portion extending outwardly from said S-shaped cross section, said stiffening portion including a laterally projecting portion extending away from the stiffening portion and overlying the U-shaped cross section and including a depending hook portion snappingly-engaged onto said raised edge.

2. The joint as claimed in claim 1 in which said U-shaped cross section and the S-shaped cross section each including sealing means disposed within overlying portions having panel edge portions telescoped therein.

* * * * *